(12) United States Patent  
Matsuzawa et al.

(10) Patent No.: US 6,354,636 B2
(45) Date of Patent: Mar. 12, 2002

(54) TUBE CONNECTING STRUCTURE

(75) Inventors: Hironori Matsuzawa; Kimihito Sasao, both of Aichi (JP)

(73) Assignee: Advance Denki Kougyou Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/785,328

(22) Filed: Feb. 20, 2001

(30) Foreign Application Priority Data

Mar. 2, 2000 (JP) ........................................ 2000-057377

(51) Int. Cl.[7] ............................................... F16L 33/02
(52) U.S. Cl. ..................... 285/334.5; 285/367; 285/354; 285/365
(58) Field of Search ............................ 285/334.5, 353, 285/354, 364, 365, 367, 179, 133.11, 148.23

(56) References Cited

U.S. PATENT DOCUMENTS

| | | | | |
|---|---|---|---|---|
| 431,816 A | * | 7/1890 | Lomasney | 285/334.5 |
| 448,717 A | * | 3/1891 | Hogan | 285/353 |
| 660,862 A | * | 10/1900 | Lovekin | 285/363 |
| 804,149 A | * | 11/1905 | Meyer | 285/354 |
| 1,185,049 A | * | 5/1916 | Best | 285/334.5 |
| 2,065,480 A | * | 12/1936 | Soper | 285/363 |
| 2,669,465 A | * | 2/1954 | Newell | 285/334.5 |
| 2,769,648 A | * | 11/1956 | Herman | 285/365 |
| 3,501,171 A | * | 3/1970 | Baron | 285/354 |
| 4,133,565 A | * | 1/1979 | Shutt | 285/224.5 |
| 4,691,944 A | * | 9/1987 | Viall, Jr. | 285/353 |
| 5,439,259 A | * | 8/1995 | Taga et al. | 285/334.5 |
| 6,179,348 B1 | * | 1/2001 | Okamoto | 285/334.5 |

FOREIGN PATENT DOCUMENTS

JP           5-322083      *   5/1993

* cited by examiner

Primary Examiner—Eric K. Nicholson
(74) Attorney, Agent, or Firm—Rader, Fishman & Grauer, PLLC (57) ABSTRACT

A tube connecting structure C1 including a gasket member 10 having annular, tub recesses 12, 13 tube members 20, 30 having folded edge portions 22, 32 formed by folding ends thereof over the outer circumference so that convex ends 23, 33 are brought into tight contact with the annular recesses of the gasket member, outer rings 40, 50 mounted onto the outer circumference of body portions 21, 31 of the respective tube members 20, 30 so that front ends 41, 51 are located behind the convex ends of the folded edge portions and rear ends 42, 52 are out of the folded edge portions, presser members 60, 70 having contact sections 61, 71 with the gasket member and outer ring pressing sections 62, 72 for pushing the rear ends of the outer rings toward the mating outer ring, and a clamp member 80 for compressing the respective presser members together with the gasket member.

4 Claims, 10 Drawing Sheets

TUBE CONNECTING STRUCTURE

BACKGROUND OF THE INVENTION

1. Field of the Invention

The present invention relates to a or structure (coupling) for connecting tubes such as plastic tubes to each other, particularly to a connecting structure excellent in sealing performance suitably used in a piping system for medicine or ultra-pure water.

2. Description of the Related Art

Figure 11:
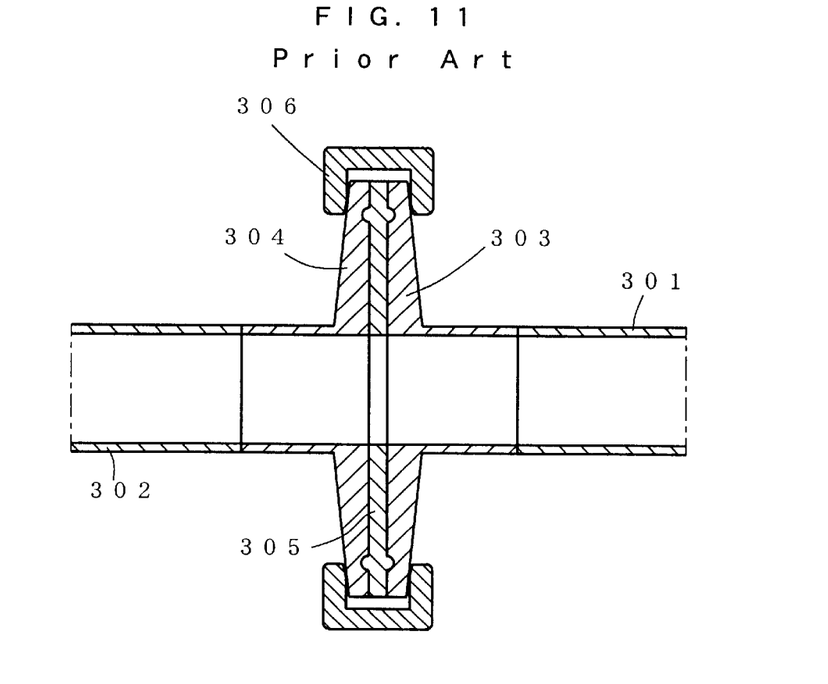
FIG. 11 sows a side sectional view of a tube connecting structure according to one embodiment of the prior art.
Figure 12:
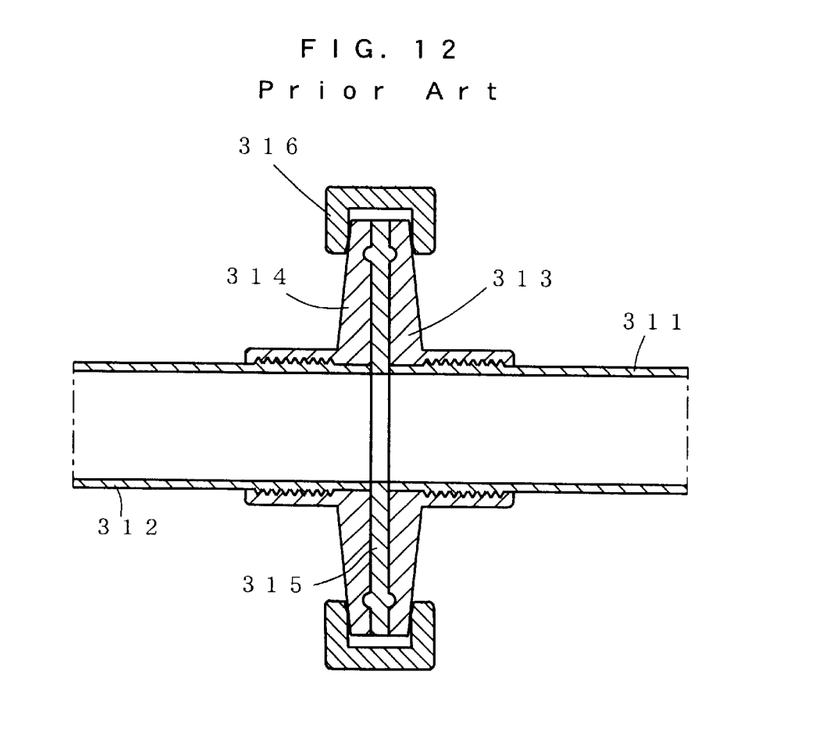
FIG. 12 shows a side sectional view of a tube connecting structure according to another embodiment of the prior art.
Figure 13:
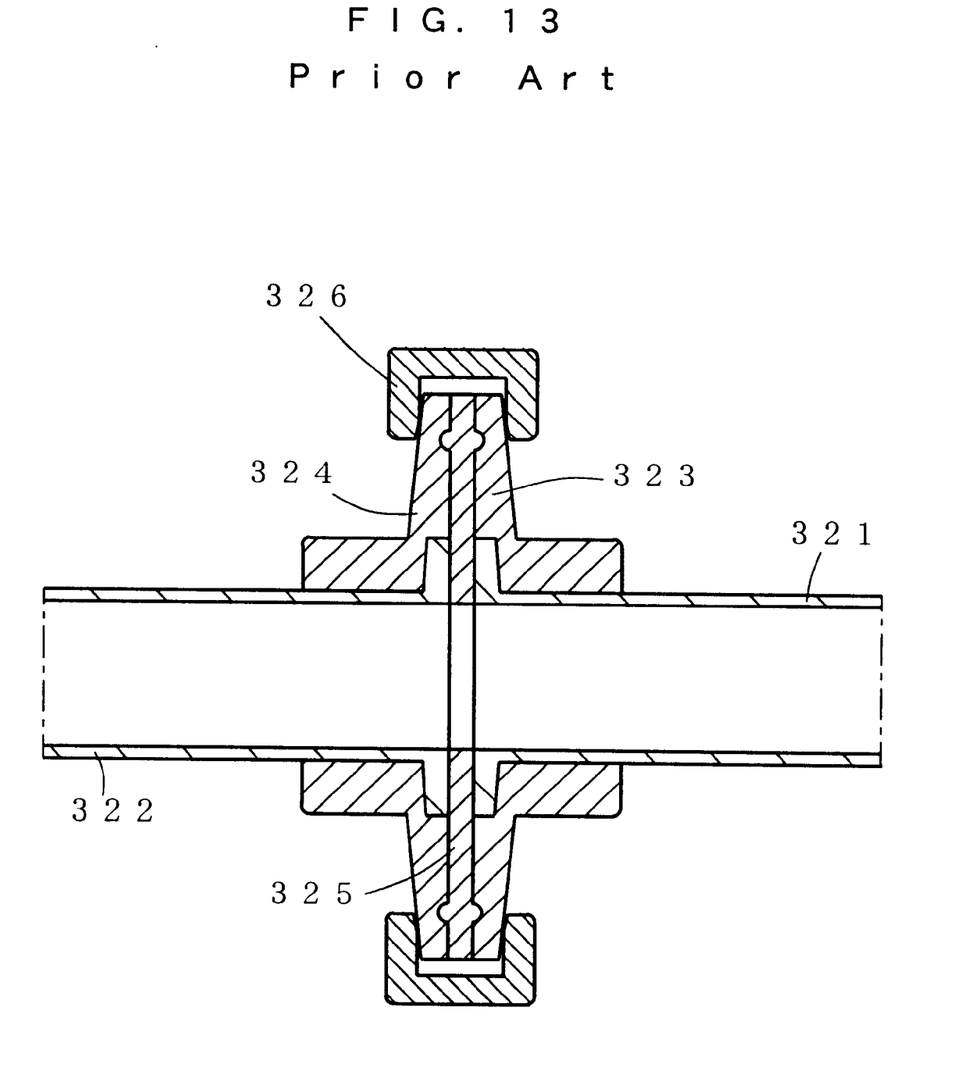
FIG. 13 shows a side sectional view of a tube connecting structure according to a further embodiment of the prior art.

Tube connecting structures for connecting plastic tubes used in a piping system for medicine or ultra-pure water have been known, as shown in FIGS. 11 to 13.

In a structure shown in FIG. 11, presser members 303, 304, also referred to as ferrules are welded, respectively, to ends of opposed two tube members 301, 302 to be connected to each other. A gasket member 305 is disposed between the presser members 303, 304 and compressed together with the presser members 303, 304 by a clamp member 306. In another structure shown in FIG. 12, presser members 313, 314 are screw-engaged with the outer circumference of opposed two tube members 311, 312 to be connected to each other. A gasket member 315 is disposed between the presser members 313, 314 and compressed together with the presser members 313, 314 by a clamp member 316. In a further structure shown in FIG. 13, when opposed two tube members 321, 322 are molded, presser members 323, 324 are attached, respectively, to ends of the tube members 321, 322 to be connected to each other by an insert molding. A gasket member 325 is disposed between the presser members 323, 324 and compressed together with the presser members 323, 324 by a clamp member 326.

According to the above-mentioned prior art connecting structures, an adaptation for attaching or fixing the presser members to the tube members is troublesome and requires skill to obtain a desired accuracy. If the desired accuracy is not obtained, the sealing performance is insufficient, which is a fatal defect in a connecting structure used in a piping system for dealing with medicine or ultra-pure water.

Also, in the above-mentioned prior art structure, it is necessary to prepare tube members having special connecting ends as described in accordance with positions to be connected together when the piping system is installed. Further, if it is necessary to change the piping after the installation, a quick response thereto is impossible.

SUMMARY OF THE INVENTION

The present invention has been made in view of the above problems in the prior art, and provides a novel tube connecting structure simple in structure, easily adaptable to various tubes, and capable of obtaining a high sealing performance in a stable manner. This tube connecting structure could also quickly respond to a requirement for a variation in piping system even after the installation thereof.

According to the invention defined by claim 1, a tube connecting structure, for connecting two tubes with each other, is provided and comprises a gasket member having a central opening and first and second annular recesses formed on opposite sides thereof along the outer periphery of the central opening, first and second tube members, each having a folded edge portion formed by folding an end thereof over the outer circumference of the tube member, wherein a convex end of the folded edge portion is brought into tight contact with the annular recess of the gasket member, first and second outer rings, each mounted onto the outer circumference of a body portion of the tube member so that a front end thereof is located behind the convex end of the folded edge portion and a rear end thereof is out of the folded edge portion, first and second presser members, each mounted onto the outer circumference of the tube member and having a contact section with the gasket member and an outer ring pressing section for pushing the rear end of the outer ring toward the mating outer ring, and a clamp member for compressing the first and second presser members together against the gasket member.

According to the invention defined by claim 2, a tube connecting structure for connecting two tubes with each other is provided, comprising a gasket member having a central opening and first and second annular recesses formed on opposite sides thereof along the outer periphery of the central opening, first and second tube members, each having a folded edge portion formed by folding an end thereof over the outer circumference of the tube member, wherein a convex end of the folded edge portion is brought into tight contact with the annular recess of the gasket member, first and second outer rings, each mounted onto the outer circumference of a body portion of the tube member so that a front end thereof is located behind the convex end of the folded edge portion and a rear end thereof is out of the folded edge portion, a male screw member mounted onto the outer circumference of the first tube member and having an outer thread, a contact section with the gasket member and an outer ring pressing section for pushing the rear end of the first outer ring toward the second outer ring, and a female screw member mounted onto the outer circumference of the second tube member and having an inner thread to be engaged with the outer thread of the male screw member and an outer ring pressing section for pushing the rear end of the second outer ring toward the first outer ring.

According to the invention defined by claim 3, a connecting structure for connecting a flanged connecting member having a flange surface to a mating tube member is provided, comprising a gasket member having a central opening in correspondence to an opening of the flanged connecting member, a contact surface in tight contact with the flange surface of the flanged connecting member on one side and an annular recess formed along the periphery of the central opening on the other side, a mating connecting tube member having a folded edge portion formed by folding an end thereof over the outer circumference thereof so that a convex end of the folded edge portion is brought into tight contact with the annular recess of the gasket member, an outer ring mounted onto the outer circumference of a body portion of the tube member so that a front end thereof is located behind the convex end of the folded edge portion and a rear end thereof is out of the folded edge portion, a presser member mounted onto the outer circumference of the tube member and having a contact section with the gasket member and an outer ring pressing section for pushing the rear end of the outer ring in the axial direction of the tube member, and a clamp member for compressing the presser member together against the gasket member.

According to the invention defined by claim 4, a tube connecting structure as defined by any one of claims 1 to 3 is provided, wherein the tube member is an elbow, a tee, a cross or a reducer.

DETAILED DESCRIPTION OF THE PREFERRED EMBODIMENTS

The present invention will be described below in more detail with reference to the attached drawings.

Figure 1:
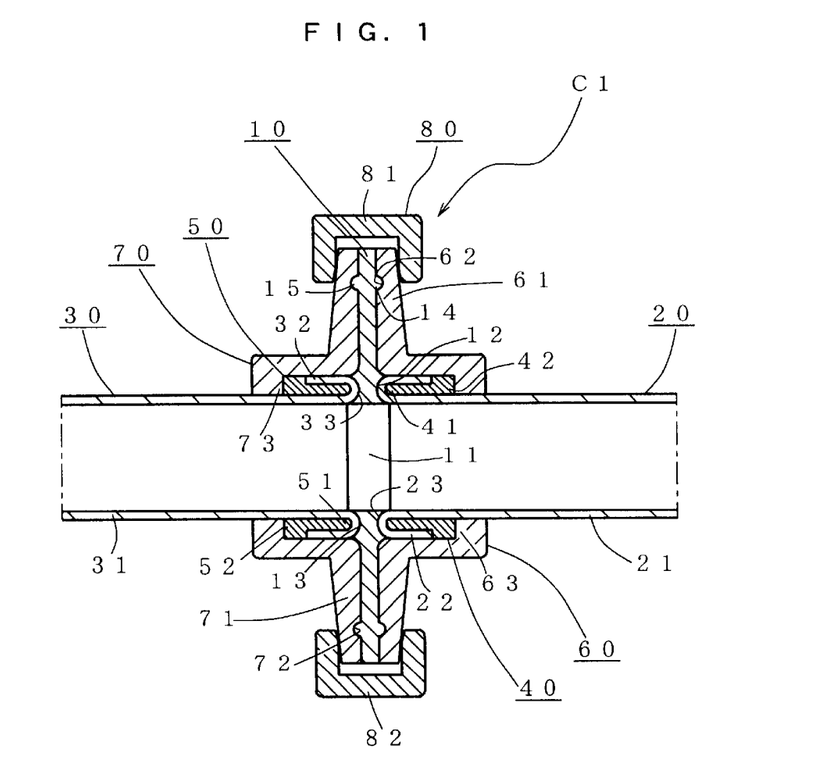
FIG. 1 shows a side sectional view of a tube connecting structure according to one embodiment of the present invention defined by claim 1.
Figure 2:
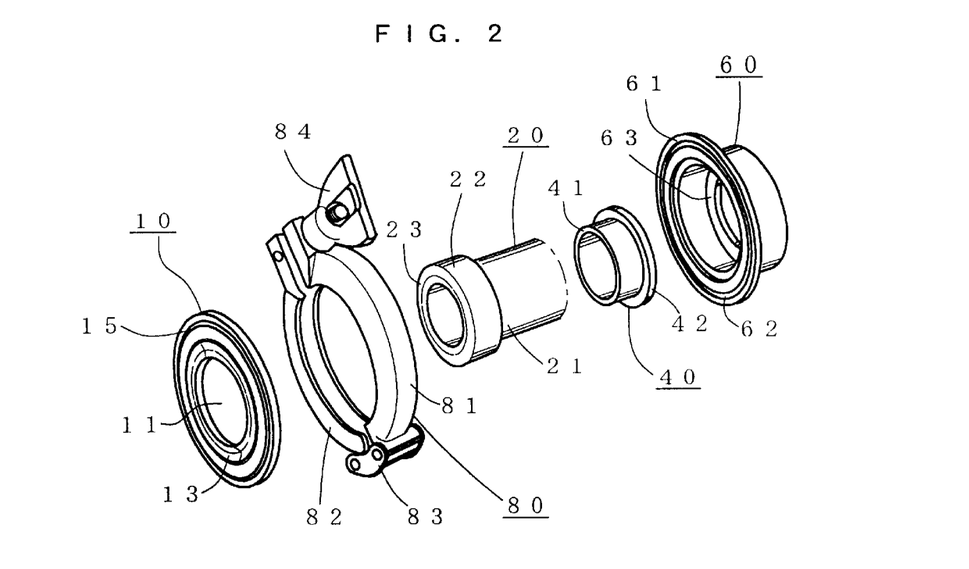
FIG. 2 shows an exploded perspective view of part of the tube connecting structure shown in FIG. 1.
Figure 3A:
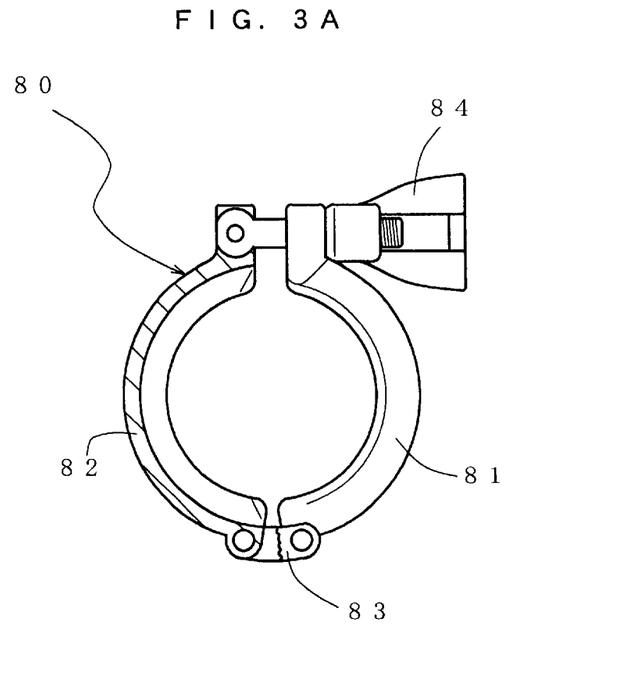
FIGS. 3A and 3B show partial cross-sectional view of one example of a clamp member used for the above embodiment.
Figure 3B:
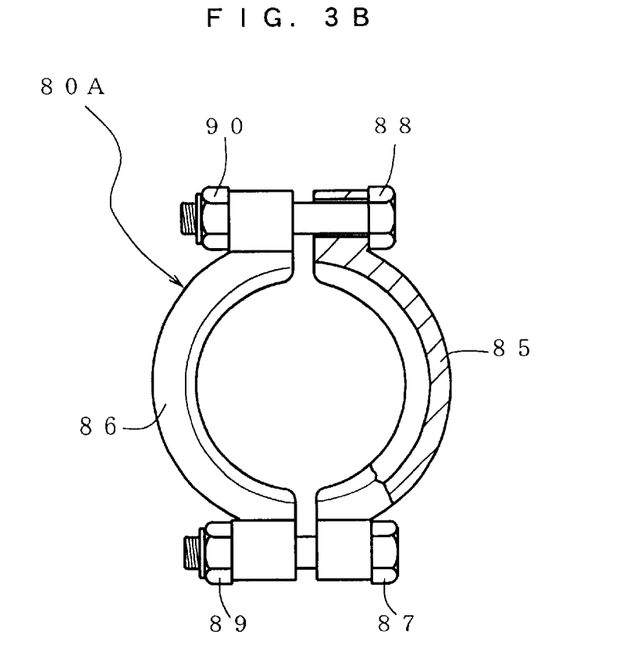
Figure 4:
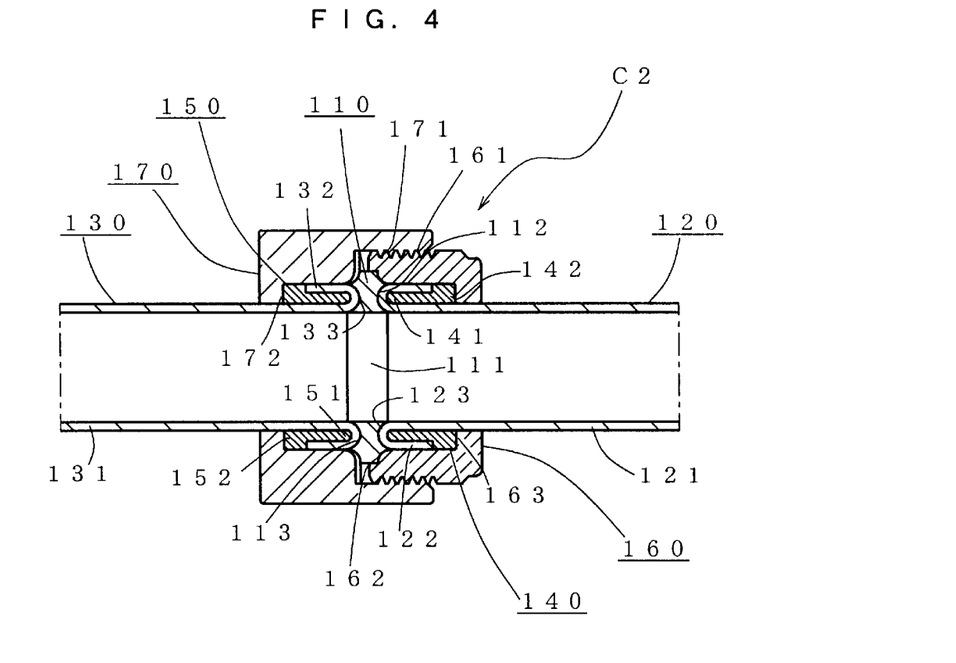
FIG. 4 shows a side sectional view of a tube connecting structure according to one embodiment of the present invention defined by claim 2.
Figure 5:
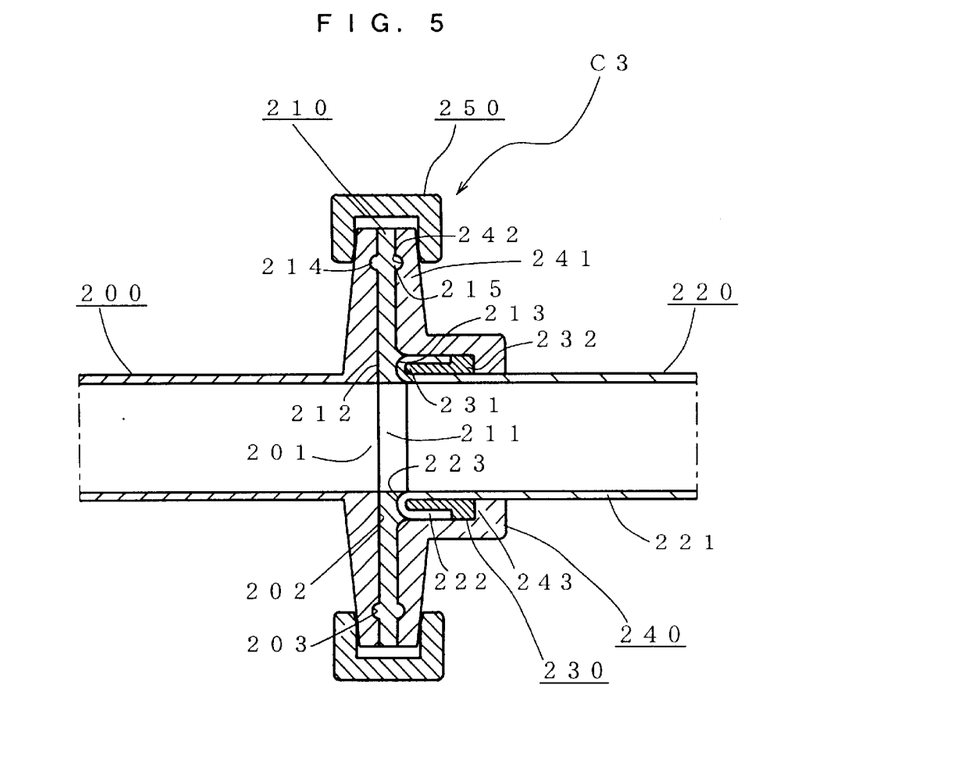
FIG. 5 shows a side sectional view of a tube connecting structure according to one embodiment of the present invention defined by claim 3.
Figure 6:
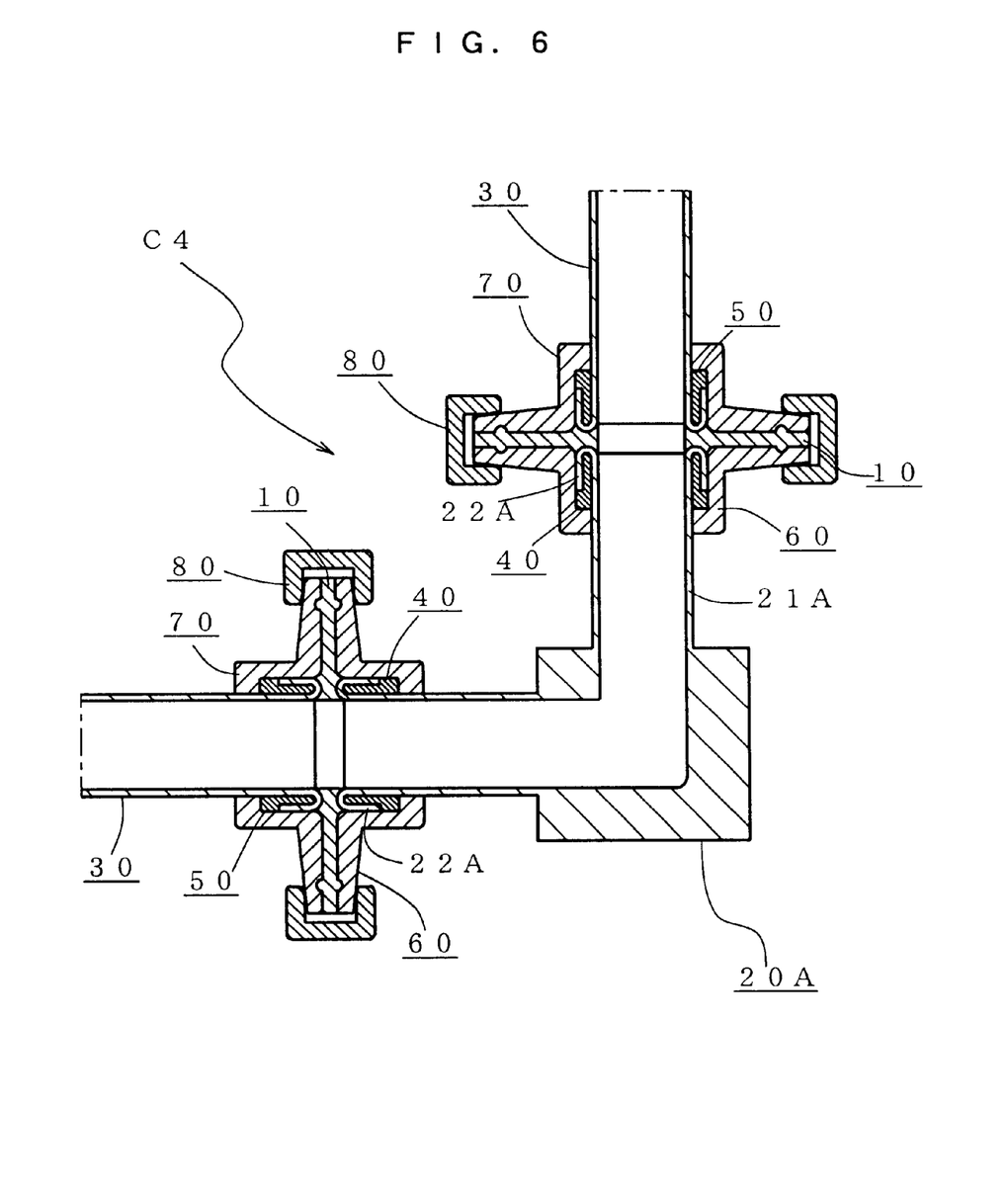
FIG. 6 shows a side sectional view of a tube connecting structure according to one embodiment of the present invention defined by claim 4.
Figure 7A:
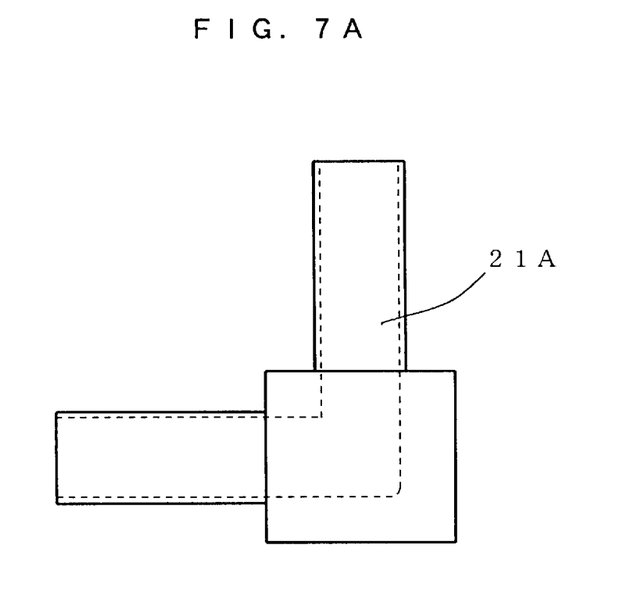
FIGS. 7A and 7B show plan view of tube m embers showing states before and after the preparation thereof.
Figure 7B:
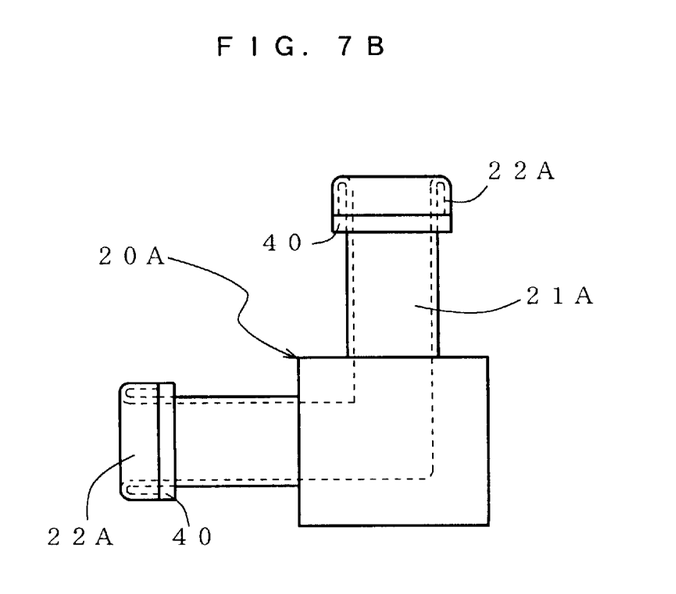
Figure 8:
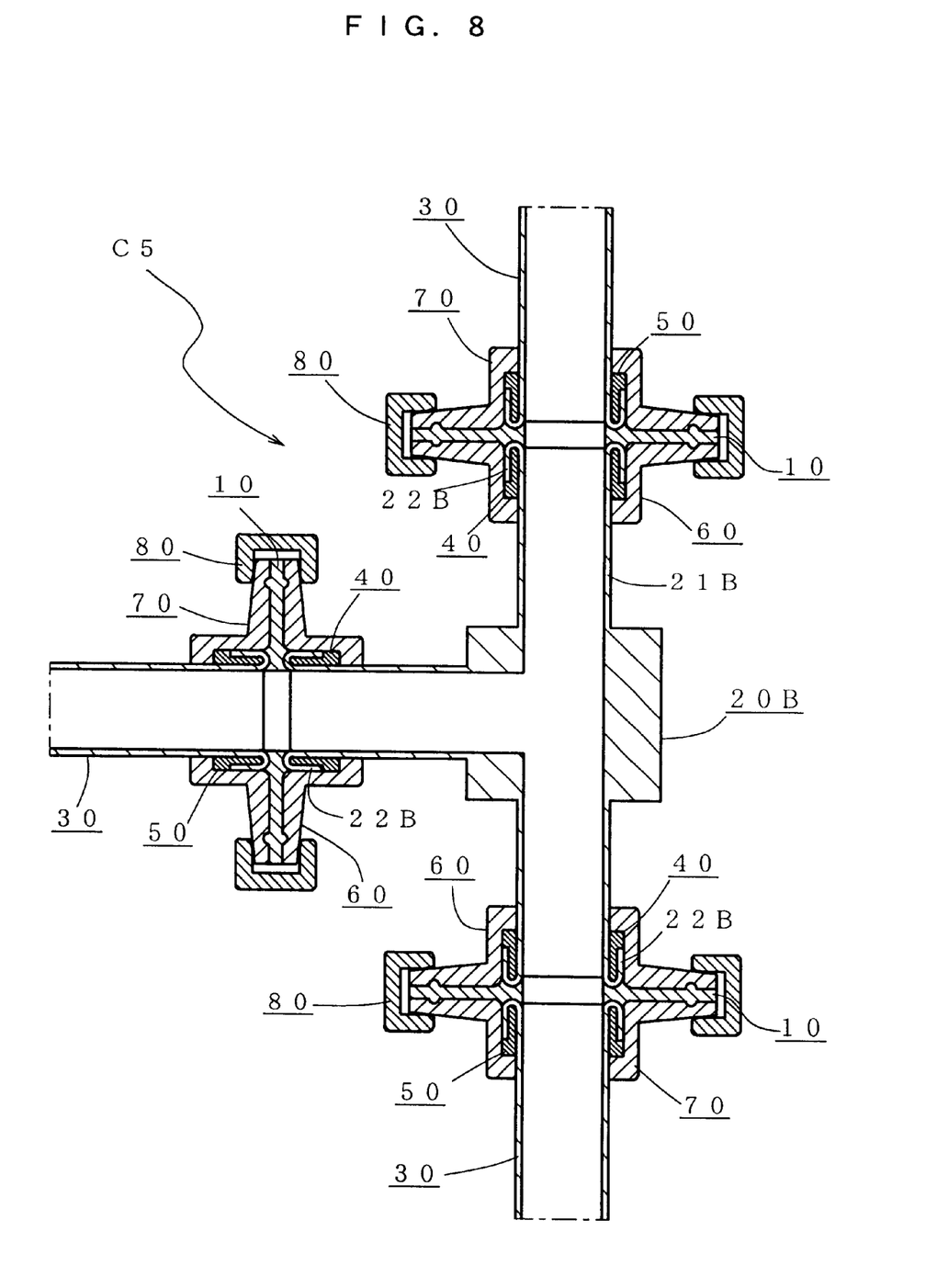
FIG. 8 shows a side sectional view of a tube connecting structure according to another embodiment of the present invention defined by claim 4.
Figure 9:
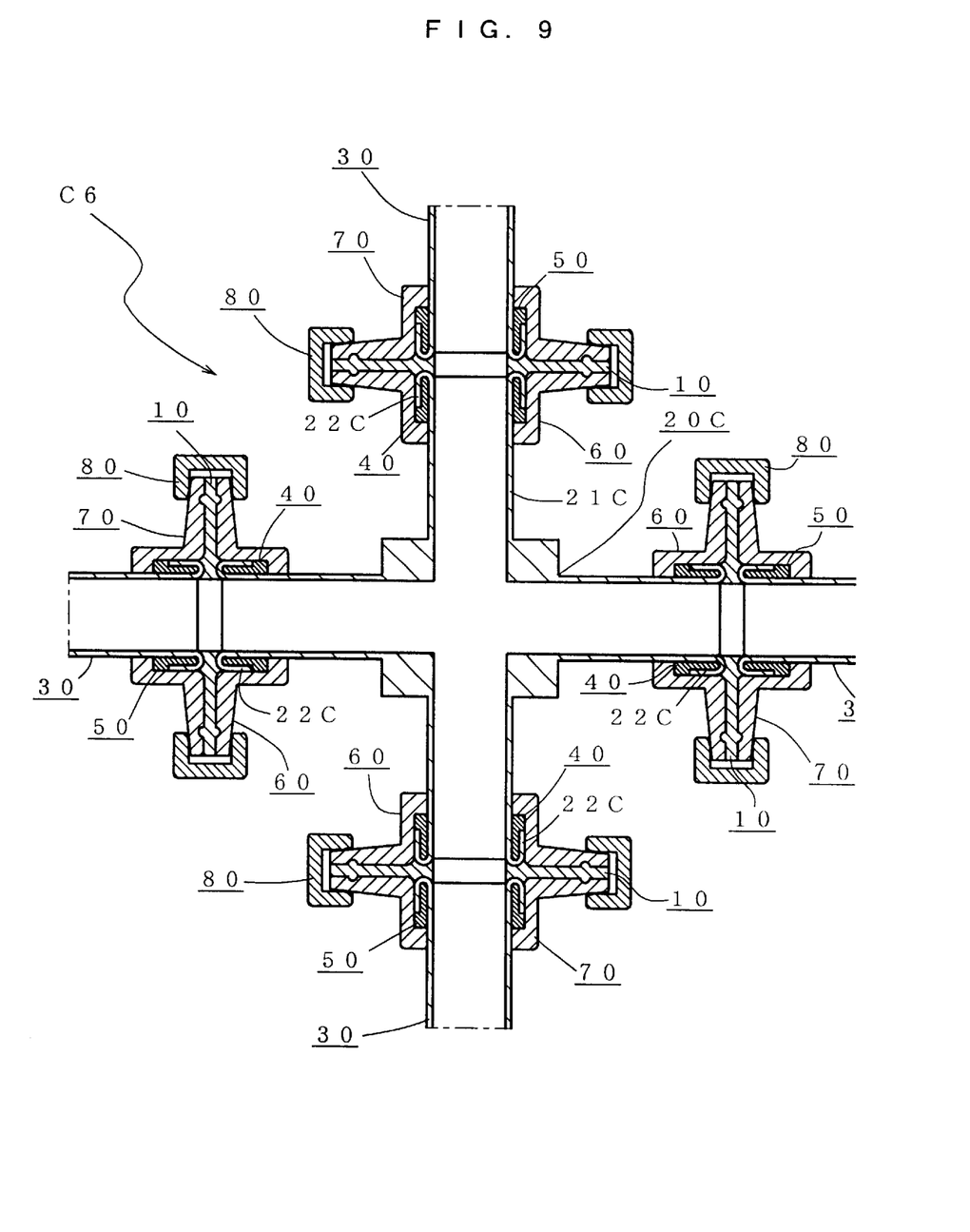
FIG. 9 shows a side sectional view of a tube connecting structure according to a further embodiment of the present invention defined by claim 4.
Figure 10:
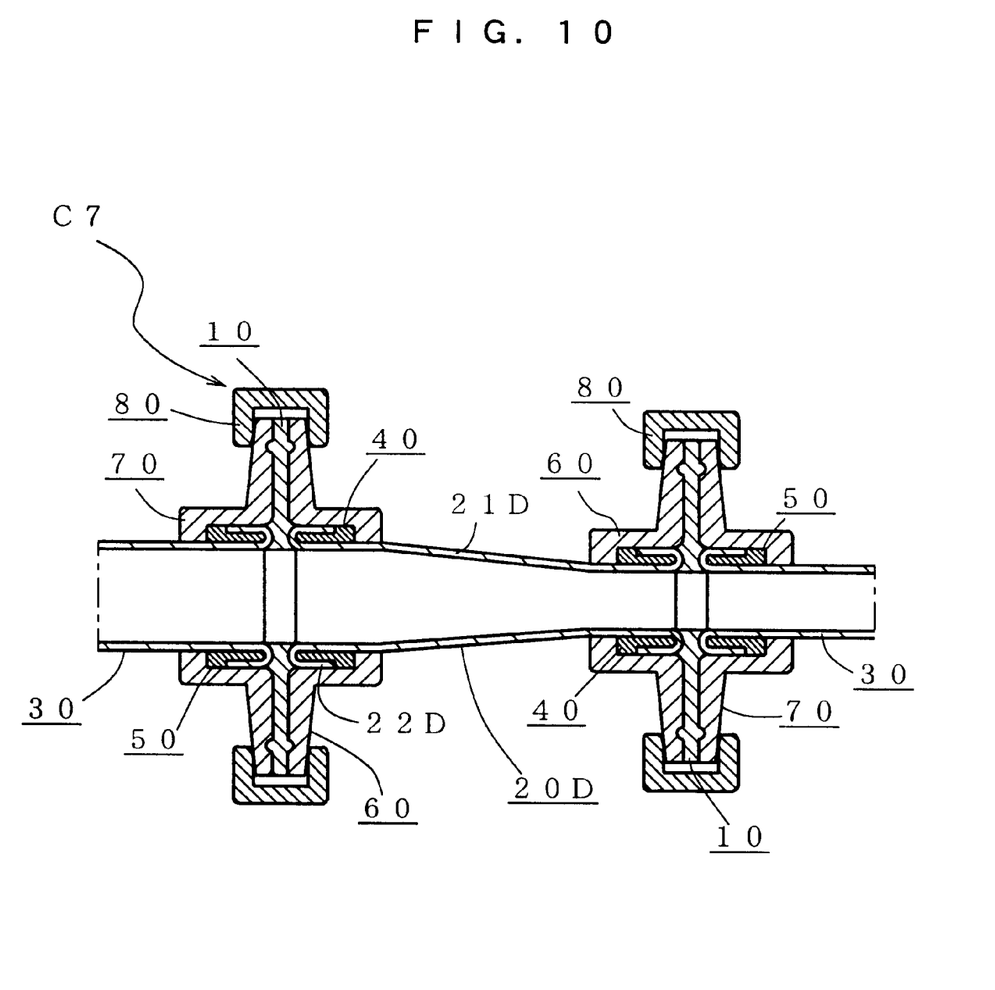
FIG. 10 shows a side sectional view of a tube connecting structure according to a furthermore embodiment of the present invention defined by claim 4.

FIG. 1 is a side sectional view of a tube connecting structure according to one embodiment of the present invention defined by claim 1: FIG. 2 is an exploded perspective view of part of the tube connecting structure shown in FIG. 1; FIGS. 3A and 3B are partial cross-sectional view of one example of a clamp member used for the above embodiment; FIG. 4 is a side sectional view of a tube connecting structure according to one embodiment of the present invention defined by claim 2; FIG. 5 is a side sectional view of a tube connecting structure according to one embodiment of the present invention defined by claim 3; FIG. 6 is a side sectional view of a tube connecting structure according to one embodiment of the present invention defined by claim 4; FIGS. 7A and 7B are plan view of tube members showing states before and after the preparation thereof; FIG. 8 is a side sectional view of a tube connecting structure according to another embodiment of the present invention defined by claim 4; FIG. 9 is a side sectional view of a tube connecting structure according to a further embodiment of the present invention defined by claim 4; and FIG. 10 is a side sectional view of a tube connecting structure according to a furthermore embodiment of the present invention defined by claim 4.

Initially, a description will be given of the invention defined by claim 1. The invention defined by claim 1 is a connecting structure C1 including a gasket member 10; first and second tube members 20, 30; first and second outer rings 40, 50; first and second presser members 60, 70; and a clamp member 80, as shown in FIGS. 1 and 2. In this regard, since the first tube member 20 and the second tube member 30; the first outer ring 40 and the second outer ring 50; and the first clamp member 60 and the second clamp member 70 are respectively symmetrical to each other in shape, the second tube member 30, the second outer ring 50 and the second presser member 70 are not illustrated in FIG. 2 to clarifying the drawing.

The gasket member 10 has a central opening 11 and a pair of first and second annular recesses 12, 13 on opposite sides thereof formed along the outer periphery of the central opening 11. The illustrated gasket member 10 is of a generally disk shape and has a pair of first and second annular ribs 14 and 15 on opposite sides thereof at a position diametrically farther from the first and second recesses 12, 13, respectively.

The first tube member 20 and the second tube member 30 have body portions 21, 31 and folded edge portions 22, 32, respectively, formed by folding ends of the body portions 21, 22 over the outer circumference thereof. Convex ends 23, 33 of the folded edge portions 22, 23 are shaped to be complementary with the annular recesses 12, 13 of the gasket member 10 so as to be in tight contact with each other. The tube members 20, 30 are made of a flexible material (plastic material) capable of being folded to form the folded edge portions 22, 23. Note that the folded edge portions 22, 23 can be very easily formed by using a conventional folding tool (such as a flaring device).

The first outer ring 40 and the second outer ring 50 are mounted onto the outer circumference of the body portions 21, 31 of the tube members 20, 30, respectively, so that front ends 41, 51 thereof are located behind the convex ends 23, 33 of the folded edge portions 22, 32, respectively, and rear ends 42, 52 are located out of the folded edge portions 22, 32. In this embodiment, the respective outer rings 40, 50 are mounted onto the outer circumference of the body portions 21, 31 of the tube members 20, 30 prior to the formation of the folded edge portions 22, 32 of the tube members 20, 30, and while maintaining such a state, the folded edge portions 22, 32 are formed.

The first presser member 60 and the second presser member 70 are mounted onto the outer circumference of the respective tube members 20, 30 (including the outer circumference of the body portions 21, 31 as well as that of the folded edge portions 22, 32), and have contact sections 61, 71 for pressing the gasket member 10 and outer ring pressing sections 63, 73 for pressing rear ends 42, 52 of the outer rings 40, 50. In the outer rings 40, 50 of this embodiment, the contact sections 61, 71 have annular recesses 62, 72 formed in correspondence to the first annular ribs 14 or the second annular rib 15 of the gasket member 10. According to this arrangement, it is possible to further facilitate the sealing function because the presser members 60, 70 are correctly in tight contact with the gasket member 10.

The clamp member 80 is used for integrally clamping the first presser member 60 and the second presser member 70 relative to the gasket member 10. As readily understood from FIG. 3A, the clamp member 80 used in this embodiment is a conventional one including a pair of half clamp sections 81, 82 to be fitted to the outer circumference of the first presser member 60 and the second presser member 70, a hinge section 83 for coupling the half clamp sections 81, 82 to be openable/closable (pivotal) relative to each other, and a clamp screw section 84 for fastening the clamp sections 81, 82. Of course, it is also possible to use a clamp 80A shown in FIG. 3B wherein a pair of half clamp sections 85, 86 are fastened to each other by two sets of a bolt and a nut 87, 89; 88, 90.

Material of the gasket member 10, tube members 20, 30 or others which is in contact with fluid may be suitably selected in accordance with kinds of fluid. Particularly, if the fluid is related to medicine, fluorine type resin is preferable because it is less elusive and excellent in purity. As for the gasket member 10, an elastomer such as rubber may be used in place of fluorine type resin.

According to the connecting structure C1 consisting of the above-mentioned members, it is possible to securely obtain a high sealing performance in a stable manner since the convex ends 23, 33 of the folded edge portions 22, 32 of the respective tube members 20, 30 are firmly brought into tight contact with the annular recesses 12, 13 of the gasket member 10, without any gap, when the first presser member 60 and the second presser member 70 are clamped in integral with the gasket member 10.

Next, a description will be given of the invention defined by claim 2. As shown in FIG. 4, the invention defined by claim 4 is a connecting structure C2 including a gasket member 110; first and second tube members 120, 130; first and second outer rings 140, 150; a male screw member 160; and a female screw member 170.

In the same manner as in the preceding embodiment, the gasket member 110 has a central opening 111 and a pair of first and second annular recesses 112, 113 on opposite sides thereof formed along the outer periphery of the central opening 111. An outer diameter of the gasket member 110 is smaller than an inner diameter of a female thread 171 of the female screw member 170 described later.

In the same manner as in the preceding embodiment, the first tube member 120 and the second tube member 130 also have body portions 121, 131 and folded edge portions 122, 132, respectively, formed by folding ends of the body portions 121, 122 over the outer circumference thereof, wherein convex ends 123, 133 of the folded edge portions 122, 123 are shaped to be complementary with the annular recesses 112, 113 of the gasket member 110 so as to be in tight contact with each other.

Also, in the same manner as in the preceding embodiment, the first outer ring 140 and the second outer ring 150 are mounted onto the outer circumference of the body portions 121, 131 of the tube members 120, 130, respectively, so that front ends 141, 151 thereof are located behind the convex ends 123, 133 of the folded edge portions 122, 132, respectively, and rear ends 142, 152 are located out of the folded edge portions 122, 132.

The male screw member 160 is attached to the outer circumference of the first tube member 120 (including the outer circumference of the body portion 121 and that of the folded edge portion 122), and has an outer thread 161, a contact section 162 against the gasket member 110, and an outer ring pressing section 163 for pushing a rear end 142 of the first outer ring 140 toward the second outer ring.

The female screw member 170 is attached to the outer circumference of the second tube member 130 (including the outer circumference of the body portion 131 and that of the folded edge portion 132), and includes an inner thread 171 to be engaged with the outer thread 161 of the male screw 160 and an outer ring pressing section 172 for pushing a rear end of the second outer ring 150 toward the first outer ring.

According to the connecting structure C2, when the female screw member 170 is engaged with the male screw member 160, the convex ends 123, 133 of the folded edge portions 122, 132 in the respective tube members 120, 130 are firmly brought into tight contact with the annular recesses 112, 132 of the respective tube members 120, 130. Accordingly, also in this connecting structure C2, in the same manner as in the connecting structure C1 of the preceding embodiment, it is possible to securely obtain a high sealing performance in a stable manner. In addition thereto, according to the connecting structure C2, it is possible to reduce the number of components in comparison with the connecting structure in the preceding embodiment.

Next, a description will be given of the invention defined by claim 3. The invention defined by claim 3 is a connecting structure C3, as shown in FIG. 5, including a flanged connecting member 200, a gasket member 210, a mating connecting tube member 220, an outer ring 230, a presser member 240, and a clamp member 250.

The flanged connecting member 200 is a standardized article (ready-made article) with an opening 201 and a flange surface 202 at one end thereof. In this embodiment, the flange surface 202 has an annular recess 203 complementary to an annular rib 214 formed in the gasket 210 described later.

The gasket 210 has a central opening 211 in correspondence to the opening 201 of the flanged connecting member 200, and is provided on one side with a contact surface 212 to be in press-contact with the flange surface 202 of the flanged connecting member 200 and on the other side with an annular recess 213 formed along the outer periphery of the central opening 211. In this regard, according to this embodiment, an annular rib 214 is provided in correspondence to the annular recess 203 of the flanged connecting member 200 on the contact surface 212, and another annular rib 215 is similarly formed on the other surface.

The mating connecting tube member 220 has a body portion 221, a folded edge portion 222 formed by folding an end of the body portion 221 over the outer circumference thereof by using the above-mentioned folding tool so that a convex end 223 of the folded edge portion 222 is brought into tight contact with the annular recess 213 of the gasket member 210.

The outer ring 230 is attached to the outer circumference of the body portion 221 of the mating connecting tube member 220 so that a front end thereof is located behind the convex end 223 of the folded edge portion 222, while a rear end thereof is out of the folded edge portion 222.

The presser member 240 is attached to the outer circumference of the mating connecting tube member 220 (including the outer circumference of the body portion 221 and that of the folded edge portion 222), and has a contact section 241 with the gasket member 210 and an outer ring pressing section 243 for pushing a rear end 232 of the outer ring 230 in the direction of the flanged connecting member (left direction in FIG. 5). In this embodiment, an annular recess 242 is formed in the contact section 241 in correspondence to the annular rib 215 of the gasket member 210.

The clamp member 250 is used for bringing the gasket member 210 and the presser member 240 into tight contact with the flange surface 202 of the flanged connecting member 200. The clamp shown in FIG. 3A or B is preferably used as this clamp member 250 in the same manner as described with reference to the embodiment of the invention defined by claim 1.

According to this connecting structure C3, when the flanged connecting member 200, the gasket member 210 and the presser member 240 are compressed together by the clamp member 250, the periphery of the opening 201 of the flanged connecting member 200 is brought into tight contact with the periphery of the central opening 211 of the gasket member 210, and the convex end 223 of the folded edge portion 222 of the mating connecting tube member 220 is also brought into tight contact with the annular recess 213 of the gasket member 210. Thus, also in this connecting structure C3, it is possible to securely obtain a high sealing performance in a stable manner as in the connecting structures C1, C2 of the preceding two embodiments.

A description will then be given of the invention defined by claim 4. The invention defined by claim 4 is characterized in that, in addition to the structure of either one of the inventions defined by claims 1 to 3, the tube member is of a shape of an elbow, a tee, a cross or a reducer. Each of these aspects will be explained with reference to FIGS. 6 to 10, respectively. Note that, in these aspects, since the initially described connecting structure C1 according to the invention defined by claim 1 is used as a basic structure, the same reference numerals are used for denoting the same members and parts as in the connecting structure C1 and an explanation thereof will be eliminated for the purpose of convenience.

In a connecting structure C4 shown in FIG. 6, an elbow is used as one of tube members 20A. The tube member 20A is formed by preparing a body portion 21A shown in FIG. 7A by a suitable method such as a machining or a molding from a resinous material and folding each end thereof over the outer circumference by the above-mentioned folding tool to form a folded edge portion 22A as shown in FIG. 7B. While a bending angle of the tube member 20A used as an elbow is about 90 degrees in the illustrated embodiment, other bending angles (such as 45 degrees) may, of course, be adopted. In the illustrated embodiment, prior to forming the folded edge portion 22A, an outer ring 40 is mounted onto the outer circumference of the body portion 21A and the folded edge portion 22A is formed in this state.

According to a connecting structure C5 shown in FIG. 8, a tee is used as one of tube members 20B. Further, according to a connecting structure C6 shown in FIG. 9, a cross is used as one of tube members 20C. According to a connecting structure C7 shown in FIG. 10, a reducer (a coaxial reducer, although there is also an eccentric reducer) is used as one of tube members 20D. In this regard, either of the tube members 20B, 20C or 20D can be simply formed, as in the tube member 20A shown in FIG. 6, by preparing a body portion 21A, 21C or 21D by a suitable method such as a machining or a molding of a resinous material and folding each end thereof over the outer circumference by the above-mentioned folding tool to form a folded edge portion 22B, 22C or 22D.

As illustrated and described above, according to the tube connecting structure of the present invention, the preparation of the tube for the connection is not troublesome but may be readily done only by forming a folded edge portion at an outer end of the tube, which results in a good and secure sealing performance in a stable manner using a simple structure. Since the preparation of the tube can be carried out in a simple manner, if there is a need for changing the fluid passage after the tubes are installed, it is possible to quickly deal therewith. Note that the connecting structure according to the present invention is applicable not only to a case wherein two tube members are connected to each other as in the invention defined by claim 1 or 2, but it is also readily applicable to a case wherein a standardized article having a flange surface is connected to various tube members as in the invention defined by claim 3.

Further, as in the invention defined by claim 4, if the tube member is an elbow, a tee, a cross or a reducer, it is possible to simply realize a connection in accordance with the requirements of the user.

What is claimed is:

1. A tube connecting structure, for connecting two tubes with each other, comprising
   a gasket member having a central opening and first and second annular recesses formed on opposite sides thereof along the outer periphery of the central opening,
   first and second tube members, each having a folded edge portion formed by folding an end thereof over the outer circumference of the tube member, wherein a convex end of the folded edge portion is brought into tight contact with the annular recess of the gasket member,
   first and second outer rings, each mounted onto the outer circumference of a body portion of the tube member so that a front end thereof is located behind the convex end of the folded edge portion and a rear end thereof is out of the folded edge portion,
   first and second presser members, each mounted onto the outer circumference of the tube member and having a contact section with the gasket member and an outer ring pressing section for pushing the rear end of the outer ring toward the mating outer ring, and
   a clamp member for compressing the first and second presser members together against the gasket member.

2. A tube connecting structure, for connecting two tubes with each other, comprising
   a gasket member having a central opening and first and second annular recesses formed on opposite sides thereof along the outer periphery of the central opening,
   first and second tube members, each having a folded edge portion formed by folding an end thereof over the outer circumference of the tube member, wherein a convex end of the folded edge portion is brought into tight contact with the annular recess of the gasket member,
   first and second outer rings; each mounted onto the outer circumference of a body portion of the tube member so that a front end thereof is located behind the convex end of the folded edge portion and a rear end thereof is out of the folded edge portion,
   a male screw member mounted onto the outer circumference of the first tube member and having an outer thread, a contact section with the gasket member and an outer ring pressing section for pushing the rear end of the first outer ring toward the second outer ring, and
   a female screw member mounted onto the outer circumference of the second tube member and having an inner thread to be engaged with the outer thread of the male screw member and an outer ring pressing section for pushing the rear end of the second outer ring toward the first outer ring.

3. A connecting structure, for connecting a flanged connecting member having a flange surface to a mating tube member, comprising
   a gasket member having a central opening corresponding to an opening of the flanged connecting member, a contact surface in tight contact with the flange surface of the flanged connecting member on one side and an annular recess formed along the periphery of the central opening on the other side,
   a mating connecting tube member having a folded edge portion formed by folding an end thereof over the outer circumference thereof so that a convex end of the folded edge portion is brought into tight contact with the annular recess of the gasket member, an outer ring mounted onto the outer circumference of a body portion of the tube member so that a front end thereof is located behind the convex end of the folded edge portion and a rear end thereof is out of the folded edge portion, a presser member mounted onto the outer circumference of the tube member and having a contact section with the gasket member and an outer ring pressing section for pushing the rear end of the outer ring in the direction of the flanged connecting member, and a clamp member for compressing the presser member together against the gasket member.

4. A tube connecting structure, as defined by any one of claims 1 to 3, wherein the tube member is an elbow, a tee, a cross or a reducer.

* * * * *